April 9, 1935.   C. L. EKSERGIAN   1,997,544
ARTILLERY WHEEL
Filed May 27, 1932
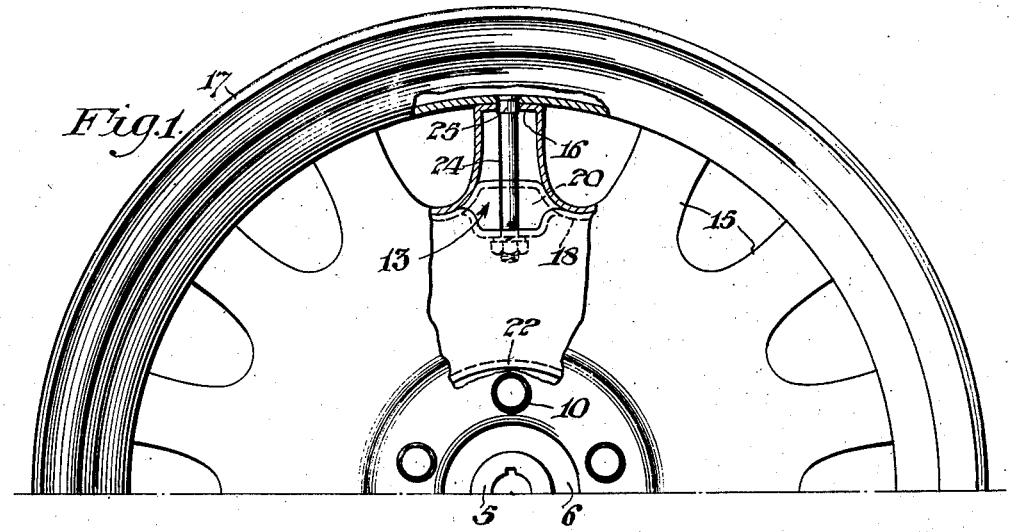
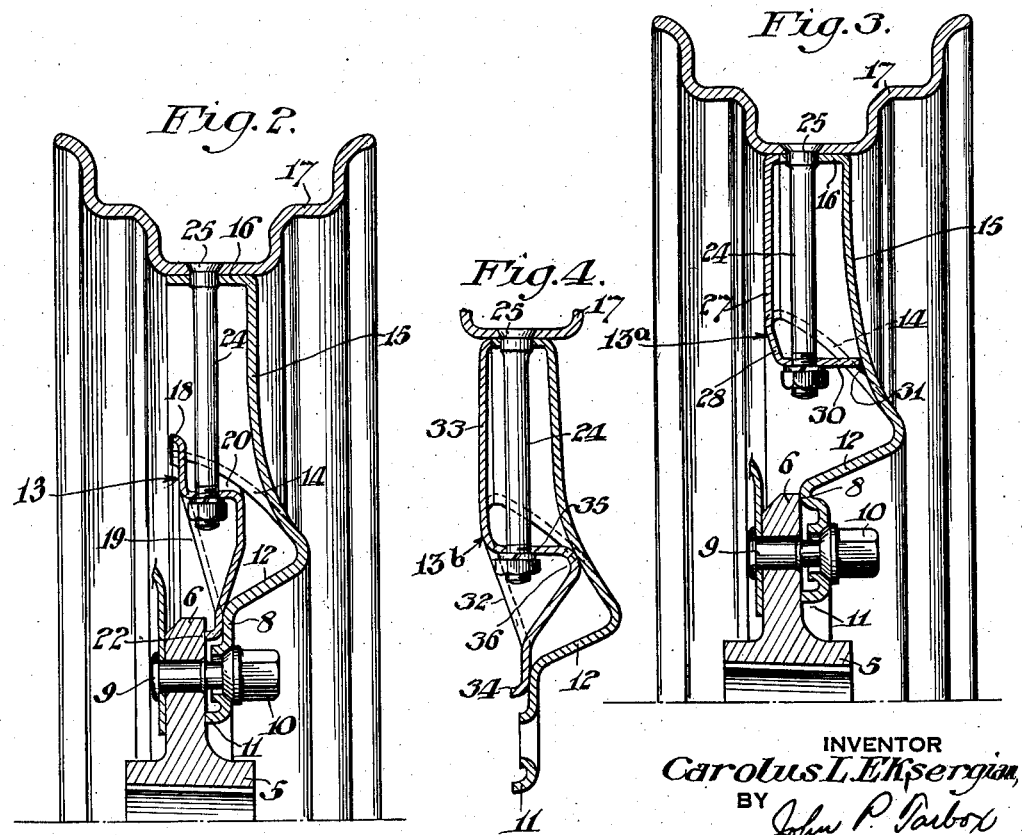
INVENTOR
Carolus L. Eksergian,
BY
John P. Barbox
ATTORNEY Patented Apr. 9, 1935

1,997,544

UNITED STATES PATENT OFFICE 1,997,544

ARTILLERY WHEEL

Carolus L. Eksergian, Detroit, Mich., assignor to Budd Wheel Company, Philadelphia, Pa., a corporation of Pennsylvania Application May 27, 1932, Serial No. 613,914

3 Claims. (Cl. 301—54)

My invention relates to wheels and particularly to pressed-metal wheels of the artillery-type for automobiles.

An object of my invention is to provide a single member that shall function as a tension-spoke anchorage, a closure for the open side of a channel spoke, a reinforcement for the spokes, nave and mounting plate, a component portion of the mounting plate, an inner strengthening annulus and as other means, or any of these features in combination with one or more of the others, within the purview of the invention.

Another object of the invention is to provide a wheel that shall be simple and durable in construction, economical to manufacture, easy to assemble, comprised of few parts, of great strength and light weight, and effective in its operation.

In practicing the invention, an outer stamping, or spider, comprises, preferably in one piece of sheet metal, such as stainless steel, a mounting plate, a preferably conical nave and hollow-section spokes, preferably of rear-opening channel section. In certain aspects of the invention, the nave may be other than conical and the mounting plate may not be an element of the single stamping. Other modifications of the parts and combination thereof may also be effected; those mentioned being indicative of preferred applications.

In the principal form, a strengthening element, or annulus 13, is disposed within an inner space of the wheel body defined by the spokes, nave and mounting plate. It has an axial section bridging inner surfaces of the stamping, preferably with one end abutting the stamping adjacent to the outer perimeter of the nave, from which it extends to the mounting plate, or to positions on the stamping short of the mounting plate, or to such position and continuing to the plate.

Portions may extend radially outward from the element to close the open rear sides of spokes of channel section, and other portions may extend to the mounting plate; the device having either one of these features or both.

Tension spokes extend through the compression spokes, connected to and between the rim and the reinforcing annulus of the invention, the latter having indentures constituting anchorages for the inner ends of the tension spokes.

The construction and arrangement of parts are such as to require substantially a minimum of material, and to work this material to substantially its maximum efficiency, to require only simple stamping dies, to facilitate assembly and welding and to render the structure an improvement, in other ways, in the art to which it relates.

Figure 1, of the accompanying drawing, is a view, partially in side elevation and partially in section, of one half of a wheel embodying the invention, the sections being taken at various planes in, or parallel to, the load-plane of the wheel, Fig. 2 is an enlarged axial section of the structure of Fig. 1, taken along a radius also constituting a central axis of one of the spokes and certain parts being shown in elevation for clearness, Fig. 3 is a view, similar to Figure 2, of a modified form of the invention, and Fig. 4 is a view, similar to a portion of Fig. 2, of a further modified form of the invention, In all of the figures, corresponding parts are designated by corresponding reference characters.

Referring to Figs. 1 and 2, a hub 5 has a flange 6 for supporting a mounting plate 8, as by studs or bolts 9 and nuts 10.

The plate 8 preferably constitutes an integral part of a one-piece sheet-metal stamping which further comprises an inner-perimetral axial flange 11, an inner conical portion 12, a conical nave 14, and spokes 15 of hollow section, preferably of rear-opening channel section. Closure elements 16, at the outer ends of the spokes, may be either integral parts of the original stamping sheet or otherwise secured thereto and to a peripheral annulus seated on the spoke ends, such as a rim 17.

A stamping, in the form of a reinforcing annulus or spider shaped member 13, is disposed in the space defined by the parts 8, 12 and 14 of the outer stamping above set forth, and comprises an outer perimetral portion 18, a conical portion 19, indentations 20 and an inner perimetral flange 22. The portion 18 is in the form of a rearwardly-turned axial flange of wave-shape, parallel to the plane of the wheel, to conformingly fit portions of the inwardly flaring spokes and the nave adjacent to the intersection of the nave with the inner ends of the spokes.

The conical portion 19 constitutes substantially an axial bridge, or diagonal reinforcing element, between the nave periphery and the mounting plate portion 8. The flange 22 takes the place of a flange usually placed on the plate 8 and cooperates with the flange 11 to space the plate from the hub flange 6 and to thereby provide for conical offset seats for the mounting nuts 10.

The indentations 26 provide axial shoulders for nuts and washers at the inner ends of tension spokes 24 that have suitable heads 25 in the rim 17 and the elements 16.

In the form of the invention shown in Fig. 3, the reinforcing annulus 13a has radially-outwardly-extending portions 27 closing the inner-open sides of the spokes 15, a conical portion 28, corresponding to the conical portion 19, and portions 30 corresponding to the shoulders 20, of Figs. 1 and 2.

The closure portions 27 have front-turned perimetral flanges conforming to, and fitted about, the edges of the spokes, where they merge into the nave. The portion 28 does not extend to the mounting plate, as in the structure of Figs. 1 and 2, but continues through the shoulders 30 to a point on the stamping adjacent to the intersection of the spokes and the stamping. This point might be at various places radially of the stamping. As shown, however, the portion 30 is of scollop or wave form around portions of the spoke, and nave at its axially outer edge, which is secured in position as by an arc welding body or bodies 31.

The form of the invention, illustrated in Fig. 4, is a combination of the structures of Figs. 1, 2 and 3, in that a conical portion 32 of the inner reinforcing annulus 13b has spoke-closure elements 33, corresponding to the closure elements 27 of Fig. 3, and an inner-perimetral axial flange 34, corresponding to the flange 22 of Figs. 1 and 2. In this form also, a shoulder 35, corresponding to the shoulders 20 and 30, has a portion 36 in side surface engagement with the nave 14 over a wider area for spot or projection welding thereto, and more widely distributing forces thereon.

In each of the forms, a simple-stamping annulus is provided in such relation to the outer, or main, stamping as to therewith constitute a reinforcing inner annular portion of substantially hollow-section providing great strength for the thin sheet-metal elements employed, sealing the inner side of the structure against moisture, and other foreign matter, and providing a firm anchorage for the inner ends of the tension spokes.

The structure is neat and compact, of low cost and easy to manufacture, and provides many advantages over previous structures in this field.

While I have shown and described particular forms of my invention, changes may be effected therein without departing from the spirit and scope thereof, as set forth in the appended claims.

What I claim is:

1. A vehicle wheel comprising, in combination, a rim, a unitary pressed metal spider member having a bolting-on flange, a substantially conically extending nave portion, radially extending spokes extending outwardly thereof, said spokes having integral end closures, a reinforcing annulus interconnecting the bolting-on flange and the periphery of said conical nave portion, and a plurality of tension spokes interconnecting said rim and reinforcing annulus and passing through the integral end closures of said spokes.

2. A vehicle wheel comprising, in combination, a rim, a unitary spoke spider including a radially extending mounting flange, a substantially axially extending hub shell portion, a substantially conically extending nave portion outwardly thereof, and a plurality of substantially radially extending spokes outwardly of said nave portion and having their root portions pressed therefrom, a reinforcing member interconnecting the periphery of said nave and said mounting flange, and a plurality of tension spokes interconnecting the rim and said member and passing interiorly of said radially extending spokes.

3. A wheel comprising a stamping including compression spokes of channel section and a nave, a peripheral annulus seated on the outer ends of the compression spokes, a member having portions closing the open sides of said spokes, and a portion extending laterally, of the spokes, and tension spokes interiorly of said compression spokes connecting said laterally-extending portion of said member and the peripheral annulus seated on the outer ends of the compression spokes.

CAROLUS L. EKSERGIAN.